United States Patent
Horiuchi et al.

(10) Patent No.: US 7,551,854 B2
(45) Date of Patent: Jun. 23, 2009

(54) METHOD TO PROVIDE CALLER'S LOCATION IN IP PHONE SYSTEM, OPTICAL TRANSMISSION SYSTEM, OPTICAL CONNECTOR, AND OPTICAL NETWORK UNIT

(75) Inventors: Yukio Horiuchi, Kamifukuoka (JP); Noboru Edagawa, Tokyo (JP)

(73) Assignee: KDDI Corporation, Tokyo (JP)

( * ) Notice: Subject to any disclaimer, the term of this patent is extended or adjusted under 35 U.S.C. 154(b) by 551 days.

(21) Appl. No.: 11/172,399

(22) Filed: Jun. 29, 2005

(65) Prior Publication Data
US 2005/0286893 A1 Dec. 29, 2005

(30) Foreign Application Priority Data
Jun. 29, 2004 (JP) ............................. 2004-191613

(51) Int. Cl.
*H04B 10/00* (2006.01)
(52) U.S. Cl. ..................... 398/72; 398/58; 398/140
(58) Field of Classification Search ............. 398/66–72
See application file for complete search history.

(56) References Cited

U.S. PATENT DOCUMENTS

| | | | | |
|---|---|---|---|---|
| 5,334,044 | A * | 8/1994 | Falossi et al. ................ 439/491 |
| 6,611,516 | B1 * | 8/2003 | Pirkola et al. ................ 370/352 |
| 6,760,780 | B1 * | 7/2004 | Chitturi et al. ............... 709/248 |
| 6,816,579 | B2 * | 11/2004 | Donovan et al. .......... 379/88.17 |
| 6,847,856 | B1 * | 1/2005 | Bohannon ................... 700/115 |
| 6,944,150 | B1 * | 9/2005 | McConnell et al. .......... 370/352 |
| 6,971,895 | B2 * | 12/2005 | Sago et al. ................... 439/188 |
| 7,042,985 | B1 * | 5/2006 | Wright .......................... 379/45 |
| 7,113,780 | B2 * | 9/2006 | McKenna et al. ............ 455/431 |
| 7,167,470 | B2 * | 1/2007 | Bailey et al. ................. 370/352 |
| 7,170,393 | B2 * | 1/2007 | Martin ....................... 340/10.1 |
| 2002/0150086 | A1 * | 10/2002 | Bailey et al. ................. 370/352 |
| 2004/0071164 | A1 * | 4/2004 | Baum .......................... 370/469 |

(Continued)

FOREIGN PATENT DOCUMENTS

JP 9-43432 2/1997

OTHER PUBLICATIONS

Patent Abstract of Japan, Patent No. JP9043432, Published on Feb. 14, 1997, in the name of Satou, et al.

*Primary Examiner*—Agustin Bello
(74) *Attorney, Agent, or Firm*—Christie, Parker & Hale, LLP.

(57) ABSTRACT

To inform a location of a caller to the other party in an IP phone system, a wireless IC tag preserving unique ID information is attached to an optical connector of a user connection port. The relations between locations of the optical connectors and ID information of corresponding wireless IC tags are stored in a port control database. An IC tag reader in an optical network unit (ONU) reads the ID information in the wireless IC tag attached to the optical connector to which the ONU is connected. When an emergency call is initialed, the ONU transmits destination information of the emergency call and the ID information of the wireless IC tag to a central station. A control terminal in the central station compares the ID information of the wireless IC tag against the port control database to determine a location of the optical connector. The central station adds the determined location information to the destination information of the emergency call and transmits the information to an IP network.

14 Claims, 2 Drawing Sheets

U.S. PATENT DOCUMENTS

2004/0120326 A1* 6/2004 Yoon et al. ............. 370/395.53
2005/0083911 A1* 4/2005 Grabelsky et al. ........... 370/352
2005/0232222 A1* 10/2005 McConnell et al. ......... 370/349

* cited by examiner

Fig. 2

| User connection port | IC tag ID information | User ID | Address | ONU ID |
|---|---|---|---|---|
| 1 | Nxxx121 | AB1234 | Address 1 | N123xxx |
| ⋮ | ⋮ | ⋮ | ⋮ | ⋮ |
| n | Nxxx879 | | | |

# METHOD TO PROVIDE CALLER'S LOCATION IN IP PHONE SYSTEM, OPTICAL TRANSMISSION SYSTEM, OPTICAL CONNECTOR, AND OPTICAL NETWORK UNIT

CROSS REFERENCE TO RELATED APPLICATIONS

This application claims priority to Japanese Patent Application No. 2004-191613, filed on Jun. 29, 2004, the entire contents of which are incorporated herein by reference.

FIELD OF THE INVENTION

This invention relates to a method to provide caller's location in an IP phone system, an optical transmission system, an optical connector and an optical network unit.

BACKGROUND OF THE INVENTION

A passive optical network, known as a PON system, is capable of containing a predetermined number (e.g. 32 to 64) of optical network units (ONUs) using passive optical couplers. Each user can connect his/her ONU to any optical fiber (any user connection port) within the same PON system. An optical line terminal (OLT) is disposed in a central station facing to the ONUs.

Japanese Laid-Open Patent Application JP9043432 discloses a configuration in which an identification marker having a specific reflection wavelength is embedded in each optical fiber as a means to identify respective optical fibers in an optical transmission system having a plurality of branch optical fibers, each connecting to a user, like a PON system.

A voice over IP (VoIP) system has become popular. When the VoIP system becomes suitable for emergency calls as well, it would be able to completely replace the fixed telephone network. It is indispensable for an emergency call to provide a caller's location.

A conventional wired telephone is connected through a point-to-point link and, accordingly, when an emergency call is received, it is possible to determine a location where a caller's unit is installed, namely the exact location the emergency call is transmitted, through its telephone number.

In a PON system which uses a point-to-multipoint link, however, since each ONU can freely move within the same PON system as stated above, it is not possible under the present circumstances to determine a location an emergency call is transmitted. For instance, when one user takes his/her ONU to another user's house where a user connection port in the same PON system is installed and makes an emergency call, it would be misidentified as the emergency call is transmitted from a registered address (usually user's home) of the ONU.

Similar or even worse problems arise when an IP phone usable for a wireless LAN is used for an emergency call. Since a wireless LAN allows the use of other users' wireless IP phones, it is impossible to determine a caller's location from his/her account name or user ID.

In addition, there is a possibility that someone calls up pretending to be another person by secretly using his/her ONU ID and therefore it is very risky to entirely depend on the ONU ID.

When a line identification function described in the above-mentioned reference is used, it is possible to identify a location of each user connection port through searching from a central station when an optical fiber is installed. However, when an emergency call is actually dialed, this configuration is not sufficient to pinpoint a user connection port connected to the caller's IP phone. That is, in order to identify a location of an emergency call, it is necessary to pinpoint the caller's ONU first. Considering the possibility that the ONU ID might be cheated in the first place, the central station must scan its entire user connection ports to identify an optical fiber having the user connection port to which the caller's ONU is connected. This method is time-consuming and unrealistic in case of emergency.

Moreover, in the configuration described in the above reference, it is necessary to provide an optical fiber with a reflector having a specific reflection wavelength for each user and thus production costs would increase. In addition, it is required to check each optical fiber using an exclusive optical wavelength and hence it imposes a burden on an OLT in the central station.

SUMMARY OF THE INVENTION

According to an exemplary embodiment of the invention, a method to determine a caller's location in an IP phone system is provided. Relation between at least one user connection port to which an IP phone is connected and a corresponding location of the user connection port is stored in a port control information file. When a call is dialed from the IP phone, a connection request signal including destination information and port ID information of the user connection port to which the IP phone is connected is transmitted to a central station. In the central station, the port ID information included in the connection request signal of the call is checked against the port control information file to detect a location of the user connection port to which the IP phone is connected and the information indicating the detected location and the destination information are sent to an IP network.

According to another exemplary embodiment of the invention, in an optical transmission system having a central station connected to an IP network, a plurality of user units, each having an IP phone function, and optical transmission line connecting between the central station and the plurality of user units, the improvement comprises a plurality of optical connectors, each optical connector disposed at one of a plurality of user connection ports of the optical transmission line to which the plurality of user units are connected respectively, each optical connector having an identification medium with unique port ID information, a plurality of optical network units, each optical network unit disposed in one of the plurality of user units to connect to one of the optical connectors, and having a reader to read the port ID information stored in the identification medium of the optical connector to transmit a connection request signal including destination information and the port ID information to the central station when the IP phone originates a call, a port control information file to store relations between the port ID information preserved in the identification mediums of the optical connectors attached to the respective user connection ports and corresponding locations of the optical connectors, and a repeater disposed in the central station to detect, when the user unit transmits the connection request signal for the call, a location of the optical connector to which the IP phone originating the call is connected by checking the port ID information against the port control information file and to send information indicating the detected location and the destination information.

An optical connector according to another exemplary embodiment of the invention includes an identification medium to preserve identification information readable from the outside. Preferably, the identification medium is embedded in frame of the optical connector. Even more preferably, the identification medium includes a wireless IC tag.

According to another exemplary embodiment of the invention, in an optical network in which an identification medium to preserve unique port ID information is disposed at each of a plurality of user connection ports to which a user unit is connectable, improvement of optical network unit connectable to the user connection port for communicating with center station through optical transmission line is provided. The improvement comprises an optical transmitter/receiver to transmit/receive a signal light to/from the central station through the user connection port, a reader to read out the port ID information stored in the identification medium, and a controller to command the optical transmitter/receiver to transmit a connection request signal including destination information and the port ID information to the central station when an IP phone function originates a predetermined call.

In the exemplary embodiments according to the invention, an identification medium preserving unique ID information is disposed at each user connection port to which a user unit is connected and therefore a location of each user connection port can be identified. When a call such as an emergency call is dialed, an ONU transmits a port ID number in the identification medium and a connection request signal for the call to the central station, making it possible to determine a location of the caller to the other party. Using this system, IP phones can be used for emergency calls.

BRIEF DESCRIPTION OF THE DRAWINGS

The above and other objects, features and advantages of the present invention will be apparent from the following detailed description of exemplary embodiments of the invention in conjunction with the accompanying drawings, in which:

FIG. 2 shows an exemplary configuration of a port control database 34.

DETAILED DESCRIPTION

Figure 1:
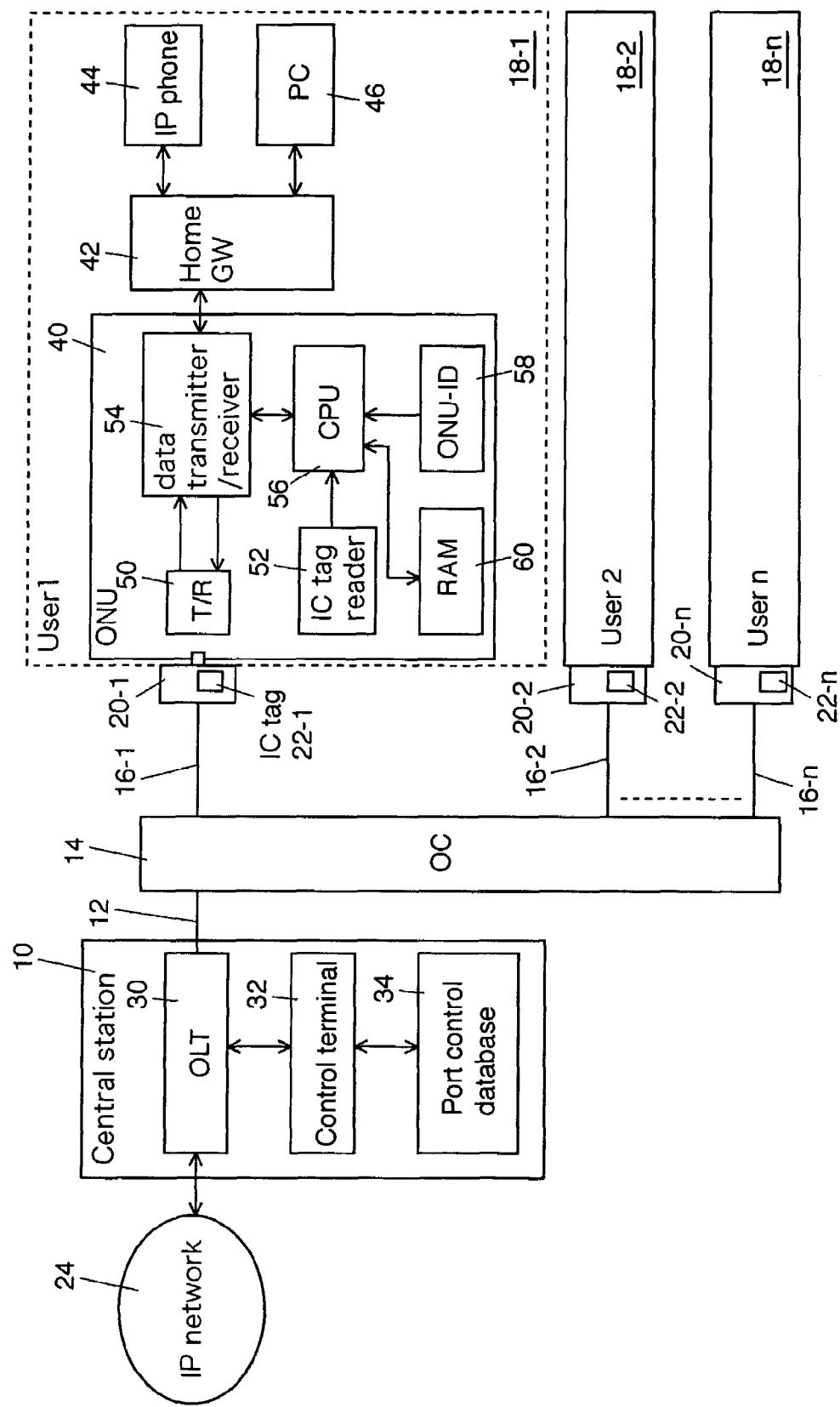
FIG. 1 shows a schematic block diagram of an exemplary embodiment according to the invention.

Explanatory embodiments of the invention are explained below in detail with reference to the drawings.

FIG. 1 shows a schematic block diagram of an exemplary embodiment according to the invention. A central station 10 connects to an optical coupler 14 through an optical fiber 12. The optical coupler 14 connects to user units 18-1 to 18-n through corresponding optical fibers 16-1 to 16-n. The optical coupler 14 divides a downstream optical signal into n portions and outputs the divided signals into the optical fibers 16-1 to 16-n respectively. The optical coupler 14 also outputs upstream optical signals from the optical fibers 16-1 to 16-n into the optical fiber 12. Optical connectors 20-1 to 20-n are disposed on one ends, namely the ends connecting to the user units 18-1 to 18-n, of the optical fibers 16-1 to 16-n. The optical connectors 20-1 to 20-n respectively include wireless IC tags 22-1 to 22-n preserving ID information so that the optical connectors 20-1 to 20-n can be uniquely identified.

The wireless IC tags 22-1 to 22-n can be either adhered on surfaces of the optical connectors 20-1 to 20-n or embedded in plug frames of the optical connectors 20-1 to 20-n. It is preferable, however, that the IC tags are embedded in the plug frames to prevent IP spoofing. The wireless IC tags 22-1 to 22-n can be embedded at the stage when frame parts are molded. The optical connectors 20-1 to 20-n in which the wireless IC tags 22-1 to 22-n are embedded beforehand according to the method described above are taken to subscribers' houses to be connected to terminals of the optical fibers 16-1 to 16-n. The optical connectors 20-1 to 20-n are then connected to ONUs 40.

The wireless IC tags 22-1 to 22-n, as stated above, preserve the unique ID information respectively. Such an ID information can be either unique in the world like a MAC address in Ethernet® or unique only in the same PON system. The former system is easier to control. A serviceperson who installed an optical connector reads the ID information of a wireless IC tag in the optical connector using an IC tag reader and registers the information together with the location of the optical connector in an after-mentioned port control database 34 in the central station 10. That is, the ID information preserved in the wireless IC tags 22-1 to 22-n functions as port ID information with which each of the user connection ports to which the user units (18-1 to 18-n) are connected can be uniquely identified.

The central station 10 connects to an IP network 24 such as the Internet on the other end. That is, an OLT 30 in the central station 10 includes a function to relay signals between the optical fiber 12 and the IP network 24. Various kinds of well-known signal transmission mediums besides the optical fibers can be used as the medium between the OLT 30 and the IP network 24. In addition to the OLT 30, the central station 10 includes a control terminal 32 to monitor the optical transmission lines of the optical fiber 12, the optical coupler 14 and the optical fibers 16-1 to 16-n and to control connections of the user units 18-1 to 18-n, and a port control database 34 to control locations of the respective user connection ports. Specific functions of the control terminal 32 and the port control database 34 about emergency call are described later.

The internal configuration of the user unit 18-1 is explained below. The user units 18-1 to 18-n have basically the same configuration although their attachments might differ according to services and functions that users choose.

The user unit 18-1 basically includes an ONU 40, a home gateway 42, one or more IP phones 44, and one or more computers (PCs) 46. The home gateway 42 can be a so-called router. The home gateway 42, the IP phone 44, and the computer 46 are sometimes connected to the same LAN (Local Area Network) to form a home LAN.

The ONU 40 includes an optical transmitter/receiver 50 to receive downstream optical signals from the optical connector 20-1 and to transmit upstream optical signals into the optical fiber 16-1 connected to the optical connector 20-1, an IC tag reader 52 to read ID information stored in the wireless IC tag 22-1 attached to the optical connector 20-1, a data transmitter/receiver 54, a CPU 56 to control the ONU 40, a nonvolatile memory (or ROM) 58 to store the ID information of the ONU 40, and a rewritable memory (e.g. RAM) 60 to store the ID information in the wireless IC tag 22-1 read by the IC tag reader 52.

The general operation of this exemplary embodiment is explained first. The CPU 56 in the ONU 40 commands the IC tag reader 52 to read the ID information of the IC tag 22-1 attached to the optical connector 20-1 which connects to the ONU 40 when the power is turned on and when a link between the ONU 40 and the OLT 30 is to be established. In addition, the CPU 56 can command the IC tag reader 52 to read the ID information in the IC tag 22-1 when any of the information processing devices, namely the home gateway 42, the IP phone 44 or the PC 46, sends a connection request signal to the central station 10. This is useful to reduce such possibilities that the stored data in the RAM 60 is camouflaged through rewriting.

Having read the ID information in the wireless IC tag 22-1, the IC tag reader 52 informs the information to the CPU 56.

The CPU 56 stores it in the memory 60. Practically, the memory 60 can be a built-in memory of the CPU 56.

The IC tag reader 52 can be a type that automatically detects the wireless IC tag 22-1 that enters within a predetermined range to read its ID information even if there is no command from the CPU 56. It is also applicable that the IC tag reader 52 has a built-in memory that stores the read-out ID information instead of the memory 60. In such a modified configuration, the load of the CPU 56 is reduced. The IC tag reader 52 can include both functions to autonomously read ID information and to start reading when the command from the CPU 56 is received.

The IC tag reader 52 is not capable of reading the ID information in the wireless IC tag 22-1 when the wireless IC tag 22-1 is not within a predetermined range, e.g. in such a condition that the optical connector 20-1 is not actually connected to the ONU 40. When the IC tag reader 52 is unable to detect the wireless IC tag 22-1 or to read the ID information even if the wireless IC tag 22-1 was detectable, the IC tag reader 52 sends a read error signal to CPU 56. The CPU 56 blinks a lamp (not illustrated) or indicates an error sign on a liquid crystal panel (not illustrated) to inform a serviceperson or user of poor connection such as not yet connected when it receives an error signal. In the near future, a user would have to purchase his/her ONU at a store and to connect it to the optical connector 20-1 all by him/herself. Accordingly, the above function to inform connection status to users makes it easier for the users to find the cause of poor connection.

The data transmitter/receiver 54 applies signals (upstream signals) from the CPU 56, the home gateway 42, the IP phone 44, and the PC 46 to the optical transmitter/receiver 50 in a predetermined format. The optical transmitter/receiver 50 converts the electrical signals from the data transmitter/receiver 54 into optical signals (upstream optical signals). The optical signals enter the OLT 30 in the central station 10 through the optical fiber 16-1, the optical coupler 14, and the optical fiber 12. Having received the optical signals, the OLT 30 applies signals sent for the IP network 24 to the IP network 24 and signals sent for the central station 10 to the control terminal 32.

In this exemplary embodiment, the ID information of the ONU 40 stored in the memory 58 and the ID information of the wireless IC tag 22-1 stored in the memory 60 are transferred to the central station 10 when they are needed, e.g. when a link with the OLT 30 is to be established and when an emergency call is made. That is, on demand, the CPU 56 reads out the ID information from the memories 58 and 60 and applies the information to the data transmitter/receiver 54. The data transmitter/receiver 54 transmits the ID information to the optical transmitter/receiver 50.

The control terminal 32 in the central station 10 registers the ID information of the ONU 40 into the port control database 34. FIG. 2 shows an exemplary configuration of the port control database 34. The port control database 34 includes numbers of the user connection ports, ID information of the wireless IC tags disposed on the user connection ports, subscribers' user IDs, locations of the user connection ports, and ONU IDs to be connected. As described above, when one of the optical fibers 16-1 to 16-n is led into a user's house and one of the optical connectors 20-1 to 20-n is provided, a serviceperson reads out ID information in one of the wireless IC tags 22-1 to 22-n attached to the optical connector using a reader and registers the information in the "IC tag ID information" field in the table shown in FIG. 2. Based on the ID information of the wireless IC tags sent from the ONUs 40 when links are to be established with the OLT 30, the user connection ports to which the respective ONUs 40 are connected can be identified and accordingly the ID information of each ONU 40 is registered to the corresponding cell in the port control database 34.

A downstream signal to the user unit 18-1 from the IP network 24 enters the ONU 40 in the user unit 18-1 through the OLT 30, the optical fiber 12, the optical coupler 14, and the optical fiber 16-1. The optical transmitter/receiver 50 in the ONU 40 converts the downstream optical signal into an electric signal to apply it to the data transmitter/receiver 54. The data transmitter/receiver 54 transfers the downstream signal from the optical transmitter/receiver 50 toward its destination, e.g. the home gateway 42, the IP phone 44, or the PC 46. Signals transmitted for the ONU 40 from the control terminal 32 in the central station 10 are transferred to the CPU 56 from the data transmitter/receiver 54.

The operation in a case that an emergency call is made from the IP phone 44 is explained next. When an emergency call for police, fire or rescue service is made from the IP phone 44, the call signal enters the data transmitter/receiver 54 through the home gateway 42. The data transmitter/receiver 54 informs the CPU 56 of transmission of the emergency call. The CPU 56 reads out the ID information of the ONU 40 and the ID information of the wireless IC tag 22-1 from the memories 58 and 60 respectively to apply the read-out information to the data transmitter/receiver 54. The data transmitter/receiver 54 transmits an emergency call request signal in which the two kinds of ID information is added to the emergency call signal to the optical transmitter/receiver 50. The optical transmitter/receiver 50 converts the emergency call request signal from the data transmitter/receiver 54 into an optical signal. The emergency call request optical signal from the optical transmitter/receiver 50 enters the control terminal 32 through the optical fiber 16-1, the optical coupler 14, the optical fiber 12, and the OLT 30.

As described above, when an emergency call is dialed, the control terminal 32 in the central station 10 receives, besides the destination's phone number, the ID number of the ONU 40 from which the emergency call is transmitted, and the ID information (the ID information in the wireless IC tag 22-1 attached to the optical connector 20-1) indicating the user connection port to which the ONU 40 is connected.

The port control database 34 in the central station 10 stores, as shown in FIG. 2, information indicating locations of terminals of the respective optical fibers 16-1 to 16-n, namely locations of the respective user connection ports. The control terminal 32 also preserves information of users (such as names, addresses, home telephone numbers, and given IP phone numbers of subscribers) who use the PON system that the control terminal 32 takes charge of.

Having received an emergency call, the control terminal 32 compares the ID information of the wireless IC tag 22-1 from the caller (here, it is the user unit 18-1) with the table shown in FIG. 2 to identify a location of the user connection port that the caller is using. The control terminal 32 adds the information, indicating the identified location in letters or codes, to the destination's phone number and transmits them to the IP network 24 through the OLT 30. The OLT 30 and the control terminal 32 both function as repeaters.

Based on the conversion procedures by the OLT 30 and the control terminal 32, the receiving party of the emergency call can determine the location of the caller, which satisfies the indispensable condition for an emergency call. In such cases that locations of all user connection ports are known to all the emergency service facilities in advance, it is satisfactory to transmit the information to identify a user connection port and the information to identify a PON system to which the user connection port may be assigned to the other parties.

When the caller's IP phone is given a phone number which can receive phone calls, the phone number is also reported to the other party.

In an apartment house, a LAN might be connected to an ONU and each habitant connects to the LAN. In addition, some habitants might use a wireless LAN in their homes. In such conditions, although a location of an ONU merely indicates an entrance of the apartment house, each user's location can be identified from the MAC address of a router or the like which locates at an entrance of each user. When it is necessary to identify a location of each user's home in an apartment house, the apartment house is identified through an ONU first and then a location of each user's home is identified from the MAC address. The identified location of each user can be reported to the receiving party of an emergency call accordingly. It is possible to prevent camouflages of MAC addresses by pre-providing an IC tag in an IP phone usable for a wireless LAN and confirming an ID of the IC tag.

An ID number of an ONU used by a user is registered in the central station when each user service starts. Accordingly, the control terminal 32 is capable of identifying a user from an ID number of the ONU 40 used for an emergency call. The control terminal 32 can transmit information including user's name, address, and telephone number known from the ID number of the caller's ONU 40 to the receiving party of the emergency call. With this operation, the other party can obtain the caller's address and resident name to provide other contact means with the caller besides the IP phone.

In the above exemplary embodiment, although the wireless IC tags are used, it is also applicable to use a wired IC tag connected to an IC tag reader through a cable. In such wired connection, although the reading function becomes more stable, it is required to provide a connecting device to connect an IC tag to an IC tag reader. In addition, once a connection failure occurs between an IC tag and an IC tag reader, it is impossible to read ID information in the IC tag. This increases causes for IP connection failures making it more complicated to find the cause of such failures. It is also applicable that optically readable bar codes or graphic codes are printed or sealed on the surface of the respective optical connectors 20-1 to 20-n, the surface facing to the ONU 40, and a reader to read the bar codes or graphic codes is disposed in the ONU 40.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical transmission system having a central station connected to an IP network, a plurality of user units, each having an IP phone, and an optical transmission line coupled between the central station and the plurality of user units, the system comprising:
   a plurality of optical connectors, each optical connector disposed at one of a plurality of user connection ports of the optical transmission line to which one of the plurality of user units is connected respectively, each optical connector having an identification medium for storing unique port identification (ID) information;
   a plurality of optical network units, each optical network unit (ONU) disposed in one of the plurality of user units to connect to a respective one of the optical connectors, and having a reader to read out the port ID information stored in the identification medium of the optical connector, to transmit a first connection request signal including destination information and the port ID information to the central station, when a respective IP phone originates a predetermined call, and to transmit a second connection request signal including the destination information and not including the port ID information to the central station, when the respective IP phone originates a call other than the predetermined call;
   a port control information file to store relations between the port ID information stored in the identification mediums of the optical connectors attached to the respective user connection ports and corresponding locations of each of the optical connectors; and
   a repeater disposed in the central station to detect, when the user unit transmits the first connection request signal for the predetermined call, a location of the optical connector to which the IP phone originating the predetermined call is connected by checking the port ID information against the port control information file, and to send information indicating the detected location and the destination information to the IP network.

2. The system of claim 1 wherein the identification medium comprises a wireless IC tag.

3. The system of claim 1 wherein the reader reads the port ID information in the identification medium when a respective ONU including the IP originating the call is turned on and a link between the ONU and the central station is to be established.

4. The system of claim 1 wherein the call comprises an emergency call.

5. The system of claim 1 wherein:
   the repeater comprises an optical line terminal (OLT) connected to the optical transmission line and the IP network, and a control terminal, wherein
   the OLT transmits a connection request signal for the predetermined call to the control terminal and
   the control terminal determines a location of the optical connector to which the IP phone originating the predetermined call is connected by checking the port ID information included in the first connection request signal against the port control information file, and instructs the OLT to transmit the information indicating the determined location and the destination information to the IP network.

6. An optical network comprising:
   an identification medium for storing unique port ID information and disposed at each of a plurality of user connection ports to which a user unit is connectable;
   an optical network unit connected to each of the plurality of user connection ports for communicating with a central station through an optical transmission line;
   an optical transmitter/receiver to transmit/receive optical signals to/from the central station through respective user connection port;
   a reader to read the port ID information stored in the identification medium; and a controller to command the optical transmitter/receiver to transmit a first connection request signal including destination information and the port ID information to the central station,when an IP phone originates a predetermined call, and to transmit a second connection request signal including the destination information and not including the port ID information to the central station, when the IP phone originates a call other than the predetermined call.

7. The optical network of claim 6 wherein the identification medium comprises a wireless IC tag.

8. The optical network of claim 6 wherein the reader comprises means for reading the port ID information in the identification medium when the optical network unit is turned on and when a link with the central station is to be established through the optical transmission line.

9. The optical network of claim 6 wherein the predetermined call comprises an emergency call.

10. A method for determining a caller's location in an IP phone system, the method comprising:

storing identification (ID) information for a plurality of user connectors;

initiating a call from an IP phone in a user network unit;

receiving call information, the ID information for the user connector to which the user network unit is connected, and ID information of the user network unit by a central station, when the call from the IP phone is a predetermined call;

receiving the call information and the ID information of the user network unit by the central station, when the call from the IP phone is not the predetermined call;

storing the ID information for the plurality of user connectors and ID information for a plurality of user network units in a database accessible by the central station; and comparing the received information with the information stored in the database to determine the location of the IP phone, when the call from the IP phone is the predetermined call.

11. The method of claim 10 further comprising reading the ID information for the respective user connector for transmission to the central station when the call is initiated.

12. The method of claim 11 further comprising indicating a status signal if the ID information for the respective user connector cannot be properly read.

13. The method of claim 10 wherein the ID information for each of the plurality of user connectors is stored in a tag embedded in a plug frame on the respective user connector.

14. The method of claim 10 further comprising transmitting the determined location of the IP phone to an IP network.

* * * * *

UNITED STATES PATENT AND TRADEMARK OFFICE
CERTIFICATE OF CORRECTION

PATENT NO. : 7,551,854 B2
APPLICATION NO. : 11/172399
DATED : June 23, 2009
INVENTOR(S) : Yukio Horiuchi et al.

It is certified that error appears in the above-identified patent and that said Letters Patent is hereby corrected as shown below:

Column 8, line 50, claim 6    Delete "through respective",
                              Insert --through a respective--

Signed and Sealed this

Sixteenth Day of March, 2010

David J. Kappos
*Director of the United States Patent and Trademark Office*